Jan. 16, 1934.  J. R. GAMMETER  1,943,381
METHOD FOR MAKING RUBBER THREAD
Filed May 4, 1932
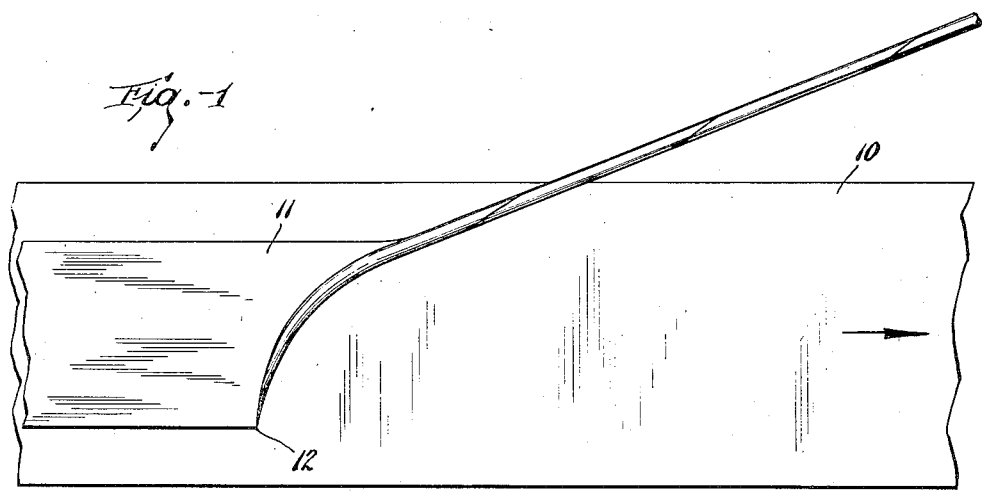
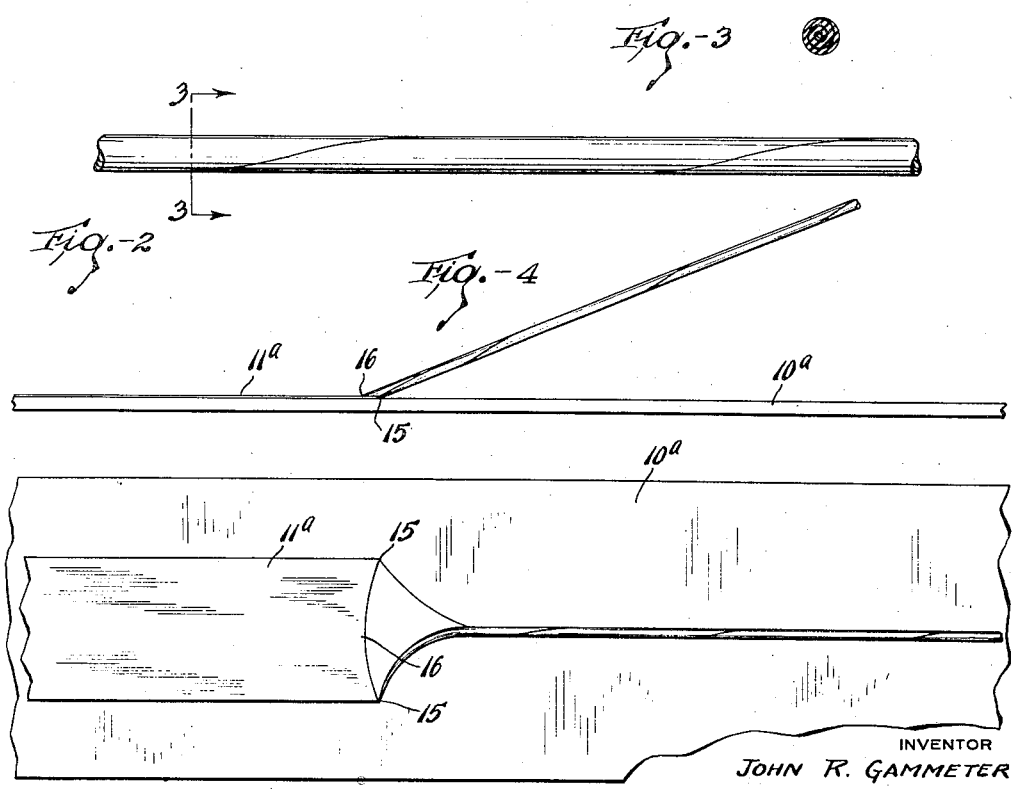
INVENTOR
JOHN R. GAMMETER
ATTORNEYS Patented Jan. 16, 1934

1,943,381

UNITED STATES PATENT OFFICE 1,943,381

METHOD FOR MAKING RUBBER THREAD

John R. Gammeter, Akron, Ohio, assignor to Revere Rubber Company, Providence, R. I., a corporation of Rhode Island Application May 4, 1932. Serial No. 609,178

4 Claims. (Cl. 117—57)

This invention relates to rubber thread and methods for making the same.

The general purpose of the invention is to provide an improved rubber thread of round cross-section and procedure for making the same whereby a flat film of rubber in tacky state is effectively twisted to produce a thread of round cross-section.

The improved thread is obtained and the improved method carried out by applying a film of rubber of determinate width by suitable means to a surface. The rubber may comprise natural or artificial latices or rubber solutions either vulcanized or vulcanizable in liquid or semi-liquid form. The film of rubber thus produced is then twisted helically to produce round rubber thread of determinate cross-section. This may be accomplished in different ways, the particular method herein disclosed and claimed comprising withdrawing the film from the surface on which it is formed under tension and at the same time twisting the film to form the thread. The film is, of course, twisted while the rubber therein is still wet or tacky and where vulcanizable rubber in liquid form is used the twisting is accomplished prior to vulcanization so that the helical laminations of rubber in the twisted thread adhere to one another.

The invention is disclosed in the accompanying drawing illustrating the improved method whereby the improved thread may be obtained. It is to be understood that the invention is not limited to the specific forms thereof illustrated.

Of the accompanying drawing,

Figure 1 is a part plan view of means providing a surface on which a latex film has been applied in accordance with the invention, the film being shown withdrawn from the surface at an angle to said surface and at an angle to the edges of the film and twisted;

Figure 2 illustrates the rubber thread thus formed in elevation;

Figure 3 is a section on line 3—3 of Figure 2; and

Figures 4 and 5 are respectively a side elevation and plan of means providing a surface on which a film of latex has been applied, the latex film being shown withdrawn at an angle to the surface in the direction of the edges of the film and twisted.

Referring to Figures 1 to 3 of the drawing, the numeral 10 designates the means for providing the surface which may be a web, disk or other means and may be arranged to travel respecting an applicator (not shown) where the film of rubber of determinate width 11 is applied. The film 11 is withdrawn from said surface at the point 12 under tension and is at the same time twisted, the direction of withdrawal of the thread as shown in Figure 1 being not only at an angle to the surface 10, but also at an angle or to one side of the edges of the film. This forms the film into a thread of round cross-section with helical convolutions. The thread thus formed is shown in Figures 2 and 3.

As will be apparent from the illustration in Figure 1, the edges of the film tend to adhere to the surface 10 more strongly than the intermediate portions of the film and this facilitates the formation of the film into thread of uniform cross-section.

Referring to Figures 4 and 5, it will be apparent that the improved thread may be formed by withdrawing the film 11ᵃ at an angle to the surface 10ᵃ and in the direction of the edges of the film. The twisting of the film in this instance as in Fig. 1 forms the film into a thread of round cross-section with helical convolutions. It is to be noted that the edges of the film adhere at 15, 15 more strongly than the central portion of the film 16 which pulls away from the surface 10ᵃ more easily. As we have pointed out above, this facilitates formation of the film into round thread of uniform cross-section.

The improved thread may be made in various sizes from extremely fine thread up to quite coarse thread, depending upon the width and thickness of the film formed. It may be subsequently covered with cotton, silk or other thread, and in either its covered or uncovered state may be woven, knitted, sewed, wound or otherwise worked into many different fabrics, golf ball centers and other articles.

In carrying out the method, the film of rubber applied lengthwise to the surfaces 10 or 10ᵃ will have a lengthwise grain which in the thread becomes a helical grain which produces a thread of much higher tensile strength than heretofore produced.

Modifications of the invention may be resorted to without departing from the spirit thereof or the scope of the appended claims.

What is claimed is:—

1. That method for making rubber thread of round cross-section which comprises depositing liquid rubber upon a travelling surface to form a film of determinate width, withdrawing said film from said surface at an angle thereto, and forming a thread of round cross-section therefrom.

2. That method for making rubber thread of round cross-section which comprises depositing liquid rubber upon a travelling surface to form a film of determinate width, withdrawing said film from said surface at an angle thereto under tension, and forming a thread of round cross-section therefrom.

3. That method for making rubber thread which comprises forming a film of definite width of the solids deposit of an aqueous dispersion of rubber on a travelling surface, withdrawing the film from the surface at an angle thereto, and twisting the film to form a thread of round cross-section therefrom.

4. That method for making rubber thread which comprises forming a film of definite width of the solids deposit of an aqueous dispersion of rubber on a travelling surface, withdrawing the film from the surface at an angle thereto under tension, and twisting the film to form a thread of round cross-section with helical convolutions therefrom.

JOHN R. GAMMETER.